United States Patent [19]
Ziolo et al.

[11] Patent Number: 5,641,424
[45] Date of Patent: Jun. 24, 1997

[54] MAGNETIC REFRIGERANT COMPOSITIONS AND PROCESSES FOR MAKING AND USING

[75] Inventors: Ronald F. Ziolo, Webster, N.Y.; Elizabeth C. Kroll, Hamilton, Canada; Javier Tejada Palacios; Xixiang Zhang, both of Barcelona, Spain

[73] Assignee: Xerox Corporation, Stamford, Conn.

[21] Appl. No.: 500,215

[22] Filed: Jul. 10, 1995

[51] Int. Cl.$^6$ .................................................. F25B 21/00
[52] U.S. Cl. .......................... 252/67; 62/3.1; 252/62.51 R; 252/62.54; 252/62.56; 252/71
[58] Field of Search .................... 62/3.1; 252/67, 252/62.51 R, 62.54, 62.56, 71

[56] References Cited

U.S. PATENT DOCUMENTS

| | | | |
|---|---|---|---|
| 4,078,392 | 3/1978 | Kestner | 62/99 |
| 4,107,935 | 8/1978 | Steyert, Jr. | 62/3.1 |
| 4,408,463 | 10/1983 | Barclay | 62/3.1 |
| 4,474,866 | 10/1984 | Ziolo | 430/106.6 |
| 4,704,871 | 11/1987 | Barclay et al. | 62/3 |
| 4,956,976 | 9/1990 | Kral et al. | 62/51.3 |
| 5,182,914 | 2/1993 | Barclay et al. | 62/3.1 |
| 5,213,630 | 5/1993 | Hashimoto | 148/301 |
| 5,231,834 | 8/1993 | Burnett | 62/3.1 |
| 5,316,699 | 5/1994 | Ritter et al. | 252/584 |
| 5,322,756 | 6/1994 | Ziolo | 430/106.6 |
| 5,358,659 | 10/1994 | Ziolo | 252/62.54 |
| 5,362,417 | 11/1994 | Ziolo | 252/314 |

FOREIGN PATENT DOCUMENTS

1688074  10/1991  U.S.S.R. ................... 62/3.1

*Primary Examiner*—Melissa Bonner
*Attorney, Agent, or Firm*—John L. Haack

[57] ABSTRACT

A magnetic process comprising: subjecting a magnetically susceptible media to a magnetic field wherein the fluid is magnetized and the magnetized media absorbs the heat of magnetization; transferring the absorbed heat from the magnetized fluid or solid to a heat sink; removing the magnetized magnetic media from the magnetic field, wherein the magnetic media undergoes spontaneous cooling to produce a cooled magnetic media; and providing heat to the cooled magnetic media from a heat source, and wherein said process is accomplished at above about 275 degrees Kelvin.

15 Claims, 1 Drawing Sheet

*FIG. 1*

MAGNETIC REFRIGERANT COMPOSITIONS AND PROCESSES FOR MAKING AND USING

CROSS REFERENCE TO COPENDING APPLICATIONS AND RELATED PATENTS

Reference is made to commonly assigned copending applications: U.S. Ser. No. 08/178,540 (90063 I ) filed Jan. 7, 1994, now U.S. Pat. No. 5,567,564, entitled "Magnetic and Nonmagnetic Particles and Fluid, Methods of Making and Methods of Using the Same", which discloses low optical density magnetic fluids for use in liquid development compositions and wherein a submicron particle size ion exchange resin may be selected to avoid further micronization or particle size reduction processing steps; U.S. Ser. No. 08/290,125 (D/93433) filed Jul. 15, 1994, entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; and U.S. Ser. No. 08/332,174 (D/94178) filed Nov. 31, 1994, entitled "Magnetized Pigments and Method and Apparatus for Producing Magnetized Pigments", which discloses a method and apparatus for producing magnetized pigments by forming a pigment coating on an external surface of a magnetic material core. The magnetized pigment is produced by forming a vaporized core of a magnetic material and forming the pigment coating on the magnetic material core.

Attention is directed to commonly owned and assigned U.S. Pat. Nos.: 4,474,866, issued Oct. 2, 1984, entitled "Developer Compositions Containing Superparamagnetic Polymers" which discloses a developer composition containing superparamagnetic polymers; 5,322,756 (D/91331), issued Jun. 21, 1994, entitled "Expedient Method for the Preparation of Magnetic Fluids and other Stable Colloidal Systems"; 5,362,417 (D/90063), issued Nov. 8, 1994, entitled "Method of Preparing a Stable Colloid of Submicron Particles", which discloses submicron particles which are dispersible to form an aqueous colloid. Also disclosed is a method of forming the stable dispersion which includes providing an ion exchange resin, loading the ion exchange resin with an ion, and treating the loaded resin to form nanoscale particles. The resin and nanoparticles can be fluidizing to form an aqueous stable colloid. Also of interest is U.S. Pat. No. 5,358,659 (D/91332), issued Oct. 25, 1994, entitled "Magnetic Materials with Single-Domain and Multidomain Crystallites and a Method of Preparation".

The disclosures of each of the aforementioned commonly owned patents are totally incorporated herein by reference.

BACKGROUND OF THE INVENTION

The present invention relates to superparamagnetic ferrofluid materials and the use thereof in magnetic refrigeration processes. More particularly, the invention relates to magnetic refrigeration compositions and processes for use in magnetic refrigeration processes and which processes are suitable for use in magnetic refrigerators having a refrigeration initiating temperature above about 273° K. This invention is particularly applicable to magnetic heating and cooling systems and compositions which comprise nanocomposite superparamagnetic ferrofluid materials.

Magnetic refrigeration is a type of refrigeration which is accomplished generally by the cyclic operations of heat dissipation and heat absorption in the course of magnetization or demagnetization by adding or eliminating external magnetic fields applied to a magnetic substance. Magnetic refrigeration processes are theoretically analogous to conventional refrigeration processes which are accomplished by means of cyclic compression and expansion of gaseous systems. The use of magnetic fluids or ferrofluids as a coolant is disclosed, for example, in *Magnetic Fluids Guidebook: Properties and Applications*, V. E. Fertman, Hemisphere Publishing Corp., New York, 1990.

Magnetic refrigeration systems have been principally developed and used for achieving very low temperatures, for example in the milliKelvin range, for the purpose of investigating the physics of materials at low temperatures. These very low temperatures were achieved using, for example, an adiabatic magnetization and demagnetization process sequence with, for example, a paramagnetic salt, wherein the salt is magnetized during a first stage of cooling to low temperatures, by external means, followed by an adiabatic demagnetization of the salt to achieve a second stage of cooling and very low temperatures.

In low temperature regions, such as below about 15° K, the lattice specific heat of magnetic materials for magnetic refrigeration becomes small compared to the magnetic specific heat, and a large magnetic entropy change may occur. The lattice specific heat values are negligible so that magnetic refrigeration can be accomplished in low temperature regions by using a magnetic refrigeration cycle of the reverse Carnot type. Paramagnetic substances are suitable materials for use in magnetic refrigeration in this low temperature region, especially in the region below about 20° K, for example gadolinium gallium garnet.

In higher temperature regions, for example at or above 77° K, the aforementioned lattice specific heat of the magnetic substance generally becomes larger than the magnetic specific heat so that a reverse Carnot type cycle is not usable and an Ericsson cycle and ferromagnetic and ferrimagnetic materials must be used. Furthermore, the heat disturbance energy of the magnetic moment also becomes greater for paramagnetic materials at these temperature and thus paramagnetic materials become unsuitable refrigerants at these temperatures.

Magnetic refrigeration processes possess inherently high entropy changes during reversible magnetic ordering and disordering. On a volumetric basis it is estimated that magnetic refrigerators may possess entropy changes of from about 40 to about 200 times greater than those observed for compressible gas refrigeration systems.

When an external magnetic field is applied to a material, the magnetic spins in the material attempt to align with the magnetic field, thereby reducing the magnetic entropy of the spin system. If this process is performed adiabatically, the reduction in spin entropy is offset by an increase in lattice entropy, and the temperature of the specimen will rise. This temperature rise, is reversible and is known as the magnetocaloric effect ($\Delta T$). Thus, magnetic entropy reduction ($\Delta S$) of a ferromagnetic or paramagnetic material upon adiabatic application of a magnetic field causes the lattice entropy to increase by the same amount ($\Delta S$), that is, the temperature of the system will increase by $\Delta T + \Delta S/c$, where c is the thermal capacity of the material at a constant applied magnetic field. Although the change of the magnetization in paramagnetic salts is very low, the small thermal capacity of these materials at low temperatures produces a surprisingly large magnetocaloric effect below about 1° K. However, the inconvenience and energy required to attain and maintain the near absolute zero temperature and high magnetic field conditions are considerable, thermodynamically inefficient, and impractical for a variety of applications.

The reversibility of the aforementioned magnetic refrigeration process suggests that these processes could produce thermodynamic efficiencies approaching those of a Carnot cycle.

R. D. Shull et al., have described nanocomposite magnetic materials and there use in magnetic refrigeration, see for example, *Nanostructured Materials*, Vol. 1, 83–88, 1992, and Vol. 2, 205–211, 1993. However, these materials and systems are apparently limited in their application to refrigeration and are restricted to applications at or below about 25° K. A particular composition suggested as a potential high temperature magnetic refrigerant was of the formula $Nd_{0.14}(Fe_{1-x}Al_x)_{0.08}B_{0.06}$. For these or related materials to be useful in room temperature magnetocaloric applications, it is believed that the material must possess a Curie temperature of about 300° K which they do not.

Two important classes of magnetic refrigerants are: paramagnetic materials for low temperature (T<20° K) systems and ferromagnetic systems for higher temperature operation, such as from about 20° K to about 80° K. Another new class of materials, known as magnetic nanocomposites, have been suggested as an alternative refrigerant for both high and low temperature regimes due to enhanced ΔT values. It was also suggested that nanocomposite magnetic refrigerants might enable refrigerators to operate at reduced magnetic fields, see R. D. Shull et al., *Nanostructured Materials*, Vol. 2, 205–211, 1993.

U.S. Pat. No. 3,667,251, issued Jun. 6, 1972 to Miskolczy et al., discloses an absorption type refrigeration system in which a magnetocaloric pump system is used in combination with a compatible-ferrofluid refrigerant system to replace the percolator type pump or other conventional pumps.

U.S. Pat. No. 4,078,392, issued Mar. 14, 1978, to Kestner, discloses a direct contact refrigeration system utilizing magnetic fluids, sometimes referred to as ferrofluids, in combination with a suitable refrigerant. The ferrofluid is separated from the refrigerant by magnetic means and circulated to the cooling load. At the same time, the evaporated refrigerant is compressed, condensed and the expanded into direct contact with the warmer ferrofluid returning from the cooling load.

U.S. Pat. No. 4,704,871, issued Nov. 10, 1987, to Barclay et al., discloses a magnetic refrigerator operating in the 12° to 77° K range and utilizes a belt which carries ferromagnetic or paramagnetic material and which is disposed in a loop which passes through the center of a solenoidal magnet to achieve cooling. The magnetic material carried by the belt, which can be blocks in frames of a linked belt, can be a mixture of substances with different Curie temperatures arranged such that the Curie temperatures progressively increase from one edge of the belt to the other. This magnetic refrigerator can be used to cool and liquefy hydrogen or other fluids.

U.S. Pat. No. 4,956,976, issued Sep. 18, 1990, to Kral et al., disclosed is a magnetic refrigeration apparatus, modular in design, so that housing modules are alternately stacked with superconducting magnet pairs. Each module has a wheel that is rotated through the module, the wheel having cutout regions into which elements of magnetic material are inserted. Each cutout region has two elements separated by a wave spring, the wave spring biasing the elements against the housing module so that the elements are in slidable contact with the module upon rotation. In operation, the wheel carries the elements cyclically between high and low magnetic field zones. In low field regions the elements are cooled by the magnetocaloric effect and heat exchangers absorb heat from either a stagnant subcooled superfluid helium bath or a forced-flow subcooled superfluid helium stream. In high field regions the elements are heated by the magnetocaloric effect and a force flow stream of liquid helium passes through the high temperature heat exchangers absorbing heat from the magnetic refrigeration apparatus.

U.S. Pat. No. 5,231,834, issued Aug. 3, 1993, to Burnett, discloses a magnetic heating and cooling system. A magnetic fluid is pumped through at least a portion of the heating and cooling system. The fluid moves through the field of a superconducting or other type of magnet. When the fluid enters the magnetic field, it is heated as a result of the magnetization. Heat from the magnetic fluid is then transferred to a regenerator chamber. When the fluid leaves the magnetic field it is chilled. Heat from a regenerator chamber is then transferred to the fluid. External loads or sinks are heated or cooled.

U.S. Pat. No. 5,213,630, issued May 25, 1992, to Hashimoto, discloses a magnetic refrigeration composition for magnetic refrigeration including at least three kinds of magnetic substances selected from the group consisting of magnetic substances having the formula $R'Al_2$, $R'_3Al_2$, and $R'Al_{2+delta}$, where in R' is at least one element selected from the group consisting of Gd, Tb, Dy, Ho, and Er, provided that the total number of atoms satisfies the above formula and 0<delta<0.2, the composition being a mixture of the magnetic substances, wherein each kind of said at least three kinds of magnetic substances has a Curie temperature which is different from that of the other kinds and which preferably range up to about 77° K.

U.S. Pat. No. 5,182,914, issued Feb. 2, 1993, to Barclay et al., discloses a rotary dipole active magnetic regenerative refrigerator comprising a stationary first regenerative magnetic bed positioned with a stationary first inner dipole magnet, a stationary second regenerative magnetic material bed positioned with a stationary second inner dipole magnet, an outer dipole magnet that rotates on a longitudinal axis and encloses the inner dipole magnets, a cold heat exchanger, hot heat exchangers, a fluid displacer, and connective plumbing through which a heat transfer fluid is conveyed. The first and second regenerative magnetic beds are magnetized and demagnetized as the vector sums of the magnetic fields of the inner dipoles magnets and the outer dipole magnet are added together upon rotation of the outer dipole magnet, such magnetization and demagnetization causing a correlative increase and decrease in the temperature of the magnetic material beds by the magnetocaloric effect. Upon magnetization of any particular magnetic material bed, fluid flow is forced therethrough in the connective plumbing by the fluid displacer in the direction from the cold heat exchanger to one of the hot heat exchangers. Upon demagnetization of any particular magnetic material bed, fluid flow is reversed by the fluid displacer and is forced in the direction from one of the hot heat exchangers to the cold heat exchanger.

U.S. Pat. No. 5,316,699, issued May 31, 1994, to Ritter, Shull, et al., discloses a chemical process for producing bulk quantities of an iron-silica gel composite in which particle size, form, and magnetic state of the iron can be selected. The process involves polymerizing an ethanolic solution of tetraethylorthosilcate, ferric nitrate in water at low temperature under the influence of an HF catalyst. The chemical and magnetic states of the iron in the resultant composite are modified in situ by exposure to suitable oxidizing or reducing agent at temperatures under 400° C. Iron-containing particles of less than 200 Angstroms diameter, homogeneously dispersed in silica matrices may be prepared in paramagnetic, superparamagnetic, ferrimagnetic and ferromagnetic states.

U.S. Pat. No. 4,238,558, discloses low density magnetic polymeric carrier materials containing a polymer material impregnated with a magnetic elemental metal or metal oxide derived from transition metal carbonyl compounds. According to the disclosure of this patent, the carrier particles are prepared by placing in a suitable vessel particles of a polymeric material, a suspending medium, and a transition metal carbonyl, heating the mixture with agitation for the purpose of thermally decomposing the transition metal carbonyl, causing the polymer to be impregnated with a magnetic elemental metal or metal oxide of a transition metal carbonyl, followed by cooling.

Moreover, there is disclosed in U.S. Pat. No. 4,150,173 a process for preparing transparent colored magnetic materials by, for example, heating a mixture of a silicaceous material, a suspending medium, and a transition metal carbonyl, wherein the silicaceous material is coated with a magnetic elemental metal of the transition metal carbonyl.

U.S. Pat. No. 4,474,866, assigned to the assignee of the present application, and which is incorporated herein by reference in its entirety, discloses a developer composition containing superparamagnetic polymers. The developer composition disclosed in this patent consists of a dispersion of fine particles of iron oxide in a polystyrene ion exchange resin. More specifically, the developer composition consists of $\gamma$-$Fe_2O_3$ (gamma) disposed in a sulfonated divinylbenzene cross-linked polystyrene resin.

The disclosures of each of the aforementioned documents are totally incorporated herein by reference.

In the aforementioned commonly assigned U.S. Pat. No. 5,362,417 (D/90063) there is disclosed a method of forming a colloidal dispersion of submicron particles comprising: providing an ion exchange resin matrix; loading said resin matrix with an ion; and treating the resin to cause in-situ formation of submicron particles; and fluidizing said ion exchange resin and particles in an aqueous medium to form a stable colloid of said particles.

In the aforementioned commonly assigned copending application U.S. Ser. No. 08/332,174 (D/94178) is disclosed a method for producing a magnetized pigment comprising the steps of: forming a magnetic material core in a vaporized state from a vaporized magnetic material; forming a pigment coating on the magnetic material core while in the vaporized state.

A long standing problem precluding the use of magnetic refrigeration systems at elevated temperatures has been the absence of suitable magnetic refrigerant materials and formulations which have a sufficiently large magnetocaloric effect at the elevated temperatures.

There also exists a long standing need for magnetic refrigeration systems that are suitable for use at elevated temperatures, for example, greater than about 100° K, such as 300° K and above.

There also exists an environmental need to eliminate the use of chlorofluorocarbon based heat transfer fluids currently employed in high temperature, such as 300° K and above, gas cycle systems.

There remains a need for magnetic materials which can be used in magnetic refrigeration processes at or above about 273° K and preferably above about 300° K. The also remains a need for magnetic materials which can increase the operating temperature range of magnetic refrigeration processes and also decrease the magnetic field requirements for magnetic refrigeration processes.

Still further, there is a need for nanocomposite nanocrystalline particles that permit low cost, clean, and optionally dry micron and submicron polymeric composite particles that can be selected for use in a magnetic liquid formulation, and utilized as an active component in magnetic refrigeration heat transfer fluids.

Another long standing problem in the field of magnetic refrigeration has been the absence of economical magnetic refrigerant compositions and processes which are capable of functioning efficiently at about ambient temperatures, for example, above 273° K (0° C.), room temperature, for example, about 25° C., and above.

A solution to the above mentioned and related problems has been unexpectedly found and provides for a superior magnetic refrigeration material that enable magnetic refrigeration processes at substantially elevated temperatures compared to those known in the art, for example, at about 0° C. and above, wherein the material has a large magnetic moment, is easily oriented in low magnetic fields and has an ordering temperature at about 0° C. or above, as illustrated herein.

SUMMARY OF THE INVENTION

It is, therefore, an object of this invention to overcome or minimize the problems encountered in the prior art and provide magnetic refrigeration compositions and processes which are suitable for use at ambient temperatures, that is around 0° C. and above, with many of the advantages illustrated herein.

It is also an object of the present invention to provide magnetic refrigeration compositions for use in magnetic refrigeration processes at about room temperature and above.

A further object of the present invention is to provide processes for the preparation of magnetic refrigeration compositions.

Another object of the present invention is to provide a magnetic refrigeration system which has no moving parts and which parts are typically required in conventional refrigerations systems for pumping, transporting, and compressing the heat transfer fluid medium.

Still another object of the present invention is the provision of magnetic refrigeration systems wherein the movement or transport of heat transfer medium is entirely controlled by the operation and selective application of magnetic fields.

It is also an object of the present invention to provide magnetic refrigeration processes wherein the heat transfer medium may be the same, or different as the active magnetic or magnetizable component used in the magnetic refrigeration system.

A further object of the present invention is to provide high thermodynamic efficiency magnetic refrigeration processes which are suitable for use at intermediate and lower temperature, for example, 0° C. and below, for use in condensing cryogenic gases.

In another object of the present invention there is provided magnetic refrigeration processes which can be accomplished with substantially reduced applied magnetic fields, for example, applied magnetic fields of less than about 5,000 Oe.

Another object of the present invention is to provide magnetic refrigerant compositions for use in superconductor or paramagnetic cooling applications, and particularly high temperature, that is, above about 0° C., cooling applications.

These and other objects are achieved in embodiments of the present invention which relates to magnetic refrigeration compositions, processes of making the compositions, and magnetic refrigeration processes using the compositions.

In embodiments of the present invention there is provided a magnetic heating or refrigeration process comprising: subjecting a magnetically susceptible media, such as a fluid or solid to a magnetic field wherein the media is magnetized and the magnetized media absorbs the heat of magnetization; transferring the absorbed heat from the magnetized media to a heat sink; removing the magnetized magnetic media from the magnetic field, wherein the magnetic media undergoes spontaneous cooling to produce a cooled magnetic media; and providing heat to the cooled magnetic media from a heat source, wherein the process is accomplished at above about 275° K.

The present invention may, in embodiments, be accomplished with a magnetic heat transfer composition comprising a nanocomposite comprising from about 0.001 to about 60 weight percent of magnetic nanocrystalline metal oxide particles and from about 40 to about 99.999 weight percent of a resin, and optionally a liquid carrier in an amount of from about 1 to about 99 weight percent based on the weight of the nanocomposite. The aforementioned magnetic nanocrystalline particles are physically or chemically bonded to the resin and uniformly dispersed therein. The magnetic refrigerant compositions of the present invention are suitable for use at ambient room temperatures and above, and comprise aqueous and non-aqueous ferrofluid dispersions of, for example, micron or submicron sized particles or clusters comprised of magnetic nanocrystalline metal oxide particles, for example, gamma-$Fe_2O_3$ particles, highly dispersed in an ion binding resin, and which magnetic nanocrystalline particles are believed to be intimately associated or bound to an ionic polymeric matrix and which nanocrystalline particles or nanoclusters are uniformly dispersed therein. The resin selected is preferably an ionic exchange resin which provides a polymeric dispersion matrix and nucleation support sites during the formation of the magnetic nanocrystalline particles.

In embodiments of the present invention, the liquid medium or liquid vehicle provides primarily a heat transfer and material transport function. Thus, a variety of different liquids may be selected as suitable heat transfer media as desired. Preferably, the liquid or mixture of liquids do not dissolve or solubilize the nanocomposite particles to any extent. Examples of suitable liquids include known heat transfer fluids including water, alcohols, polyols, glycols, glycol ethers, ethers, and liquid metals, such as mercury, gallium, and mixtures thereof. Thus, in embodiments, the magnetic refrigerant composition may be formulated in water or methanol, or alternatively, a mixture of water and methanol.

BRIEF DESCRIPTION OF THE DRAWINGS

The above and further objects and advantages of the present invention will be readily apparent from the following description of preferred embodiments taken in conjunction with the accompanying drawings, wherein.

DETAILED DESCRIPTION OF THE INVENTION

The present invention provides, in embodiments, magnetic heat transfer compositions suitable for use in heating and refrigeration processes which exhibit unexpected and superior magnetic refrigeration properties compared to those known in the art. The properties of the heat transfer compositions enable improved magnetic refrigeration processes, for example, at and above ambient or room temperature, and which improvements are greater than would have been predicted based solely upon considerations of the chemical composition and magnetically active material content. Although not desired to be limited by theory, it appears that the improved magnetic refrigeration compositions and processes of the present invention are attributable in large part to the nanoscopic size and uniform distribution and disposition of the magnetic species within the ionic exchange matrix, and that the nanocomposites have a Curie temperature on the order of about 300° K.

The present invention provides, in embodiments, magnetic refrigeration compositions which exhibit large isothermal field induced entropy changes ($\Delta S$) in a magnetic field change. The magnetic refrigerant compositions of the present invention comprise: a magnetic component comprising magnetic or magnetizable nanoscopic metal oxide particles dispersed and stabilized within a polymeric matrix, such as an ionic exchange resin; an optional immiscible or non-dissolving, with respect to the nanocomposite particles, aqueous or non aqueous carrier liquid, such as water, glycols, alcohols, tetrahydrofuran, toluene, and mixtures thereof; and optional additives, such as additives to control or enhance the heat transfer properties of the magnetic refrigerant composition, colorants, security taggants, fragrance or odorants, corrosion inhibitors, humectants, viscosity improvers, and the like.

Figure 1:
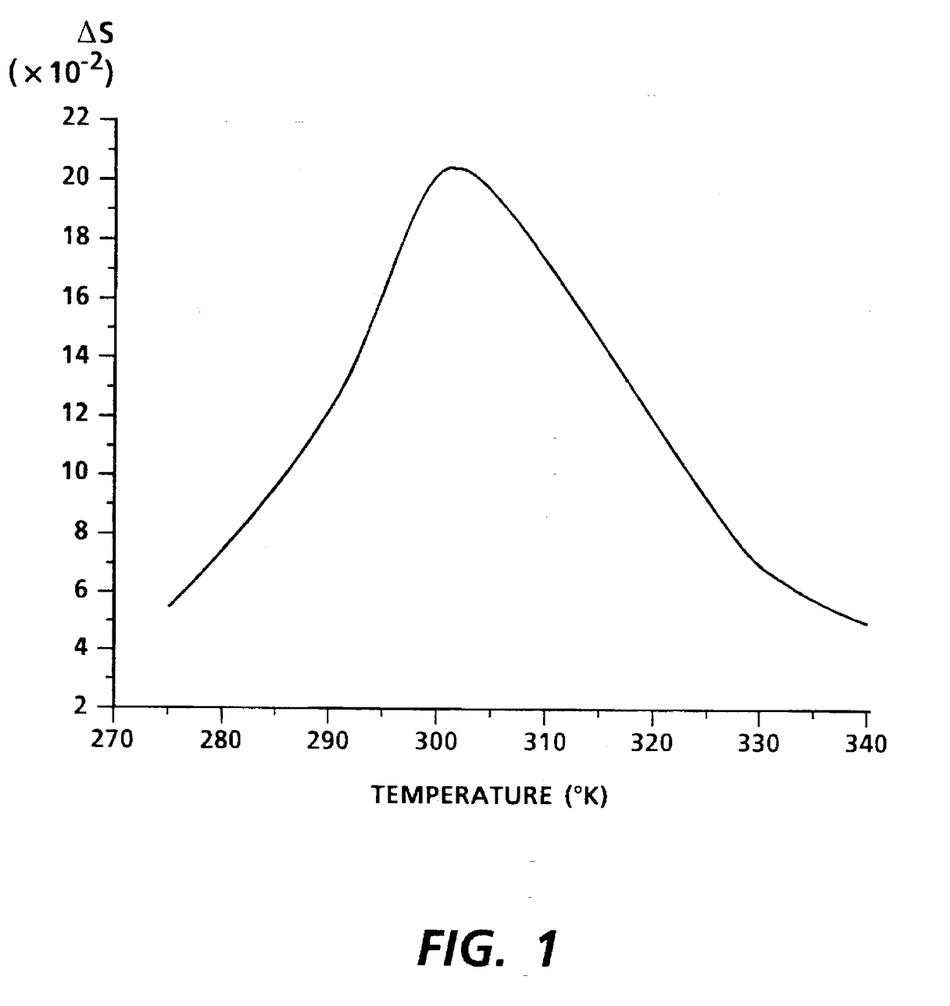
FIG. 1 is an illustration of the magnetocaloric effect exhibited by a magnetic refrigeration composition of the present invention.

In embodiments, a nanocomposite comprising $\gamma$-$Fe_2O_3$ in a sulfonated ionic exchange resin, prepared as disclosed in the aforementioned U.S. Pat. No. 5,362,417 (D/90063) produced an isothermal field induced entropy change, $\Delta S=0.2$ J/°K kg in a magnetic field change of 3 Tesla at 300° K (27° C.). Thus, the nanocomposites and the magnetic refrigeration formulation prepared therefrom are suitable as a principle constituent in ambient or room temperature magnetic refrigerant compositions, reference FIG. 1 wherein there is graphically illustrated the relationship of the isothermal entropy changes over the indicated temperature range and demonstrates the magnetocaloric effect exhibited by a magnetic refrigeration composition of the present invention. The magnetic nanocomposite components of the present invention, in embodiments, enable a variety of viable magnetic refrigerant compositions and processes, as illustrated hereinafter.

In embodiments, the compositions of the present invention are also useful as magnetic refrigerant compositions when disposed, for example, as solid-powder, liquid, colloid, suspension, slurry, and film forms. The compositions and process of the present invention are particularly useful in refrigeration applications such as heat management in, for example, xerographic copier and printing systems, such as fusing subsystems.

The magnetic refrigeration compositions of the present invention are differentiated from known magnetic refrigerant compositions in that compositions of the present invention exhibit magnetocaloric effects which are operable in the temperature range of from about 290° to about 310° K. The magnetic refrigerant compositions of the present invention are further differentiated over known magnetic refrigerants in that they possess a Curie temperature on the order of about 300° K.

An example of a magnetic refrigeration fluid of the present invention comprises a nanocomposite comprising from about 40 to about 80 weight percent of magnetic nanocrystalline metal oxide particles, such as gamma-$Fe_2O_3$ and from about 40 to about 99.999 weight percent of an ion exchangeable matrix, such as an ion exchange polymer resin or an ion exchangeable inorganic material, such as a zeolite or a molecular sieve, micas, hydrotalcites, and the like materials, and a liquid carrier or heat transfer fluid, such as methanol or ethylene glycol in admixture with for example, water, in an amount of from about 20 to about 60 weight percent based on the weight of the nanocomposite.

The magnetic refrigeration media of the present invention are, in embodiments, useful in magnetic heating or refrigeration processes comprising, for example, subjecting a magnetically susceptible media to a magnetic field wherein the media is magnetized and the magnetized media absorbs the heat of magnetization; transferring the absorbed heat from the magnetized media to a heat sink; removing the magnetized magnetic media from the magnetic field, wherein the magnetic media undergoes spontaneous cooling to produce a cooled magnetic media; and providing heat to the cooled magnetic media from a heat source. The process steps can be sequentially repeated indefinitely, for example, in excess of several million thermal cycles, with substantially no deterioration of: the compositional integrity of the magnetically susceptible media; the thermodynamic efficiency of the processes; or the magnetocaloric properties of the composition and process.

The process can be accomplished at temperatures above about 275° K, for example from about 275° K to about 320° K, and preferably in the range of from about 290° K to about 310° K. The magnetic refrigeration or heating processes, in embodiments of the present invention, can be conducted at an ambient or external temperature of above about 0° C., for example, from about 0° to about 50° C., and preferably from about 10° to 40° C.

The processes of the present invention, in embodiments, utilize a magnetic field for magnetizing the magnetic media. Suitable magnetic field strengths for magnetizing the magnetic media are from about 5,000 to about 35,000 Oersteds (Oe). In other embodiments there are provided magnetic refrigeration processes which utilize reduced magnetic field strengths of about 10,000 Oersteds (1 Tesla) or less, and preferably less than about 4,000 Oe.

The magnetic field used to magnetize the nanocomposite particles can be provided by known magnetic devices, for example, a refrigerated electromagnet, a superconducting magnet, a switchable on/off electromagnet, a non-refrigerated electromagnet, and a permanent magnet or magnets, or combinations thereof.

In embodiments of the present invention, the magnetically susceptible media has a magnetocaloric effect of about 0.05 to about 0.5 J/K-kg over a magnetic field change of about 30,000 Oe.

In another embodiment of the present invention, when the preparative process is modified to minimize or eliminate separation steps, that is, for example, separating nonmagnetic material for magnetic material, there results a magnetic product with an enhanced magnetocaloric effect or property of about 0.5 to about 50 J/K-kg over a magnetic field change of about 30,000 Oe. The improved magnetic refrigeration compositions of the present invention can be prepared by the processes including providing an ion exchange matrix; loading the matrix with an ion capable of forming a magnetic phase; treating the loaded matrix to cause in situ formation of magnetic particles or magnetic nanoclusters; optionally grinding the resulting magnetic particle impregnated ion exchange matrix; optionally drying the impregnated ion exchange matrix; and optionally dispersing the impregnated ion exchange matrix in a liquid or solid medium, to form the liquid or solid refrigerant composition, wherein the composition has an enhanced magnetocaloric effect in the temperature range of from about 275° to about 340° K. The magnetic compositions obtained thereby can be used in magnetic refrigeration processes with magnetic field strengths of less than about 1 Tesla. It is also apparent from an extensive magnetic analysis of a large number of intermediate samples obtained from a wide variety of processing steps and variations thereon that compositions obtained with minimal separation or manipulation, or samples that are obtained free of separation steps, for example, centrifugation and washing of intermediate fractions, possess the largest magnetocaloric effect. In the other process embodiments of the present invention the pH, the reaction temperature, the concentration of reactants, and the like process variables can be varied without significant deterioration of the magnetocaloric properties of the resulting magnetic media.

The magnetic refrigeration or heating processes, in embodiments of the present invention, are preferably conducted free of, or substantially without, phase separation or deterioration of the components of the magnetically susceptible media. Thus, the magnetic refrigeration compositions and processes of the present invention are robust and quite stable to extensive thermal cycling, for example, in excess of several million cycles.

The magnetically susceptible media, in embodiments of the present invention, can be moved or transported during the refrigeration and heating process steps by mechanical means, non mechanical means, magnetic means or non-magnetic means. Mechanical means include known solid and liquid pumping devices adapted to handle magnetic or magnetically susceptible media. Other suitable transport or transfer means include known magnetohydrodynamic or electrohydrodynamic means. Preferred transport means employ a minimal number of moving parts, and more preferably no moving parts. Minimizing or eliminating mechanical means or moving parts contributes to robustness and reliability of the process and reduces breakdown frequency and maintenance costs.

The magnetic nanocrystalline metal oxide particles can be formed from magnetic metal ions selected, for example, from the group consisting of transition metal elements, such as iron, nickel, manganese, a lanthanide series element, and mixtures thereof, with preparative techniques and methodologies as disclosed in the aforementioned commonly owned and assigned issued U.S. Patents, and as illustrated herein.

A preferred magnetic refrigerant composition in embodiments of the present invention, comprises a nanocomposite comprising a nanoscale gamma phase iron oxide highly dispersed in an ion exchange polymer resin. The aforementioned nanocomposite composition, in embodiments, can be optionally dispersed in a liquid carrier vehicle, for example, a water alcohol mixture, for facilitating material and thermal transport properties of the composition.

The magnetic heat transfer compositions of the present invention have a magnetic saturation moment of at least about 15 emu per gram.

The magnetic heat transfer or refrigerant compositions of the present invention exhibit a pronounced magnetocaloric effect in the temperature range of from about 290° to about 310° K.

The magnetic heat transfer or refrigerant composition can, in embodiments, be further comprised of at least one heat conducting additive selected from the group consisting of non-metallic particles, such as micron or preferably submicron polymeric particles or glass beads, and metallic filler particles, such as copper and silver.

The magnetically susceptible media of the present invention includes submicron magnetically susceptible solid nanocomposite particles dispersed in a compatible liquid medium, and submicron magnetically susceptible solid nanocomposite particles dispersed in a compatible solid. The compatible solid can be selected from known materials such as binder resins other than the aforementioned ion exchange resins, rubbers, cellulosics, glasses, and the like solid vehicles. The solid vehicles are preferably friable under moderate to high or intense shear using mechanical means, such as roll and shot milling, while the solid vehicles are preferably resistant to degradation under the relatively low shear situation associated with the magnetic refrigeration transport and circulation conditions.

Useful ion exchange polymer resins include sulfonated polystyrene resins, optionally crosslinked with, for example, divinyl benzene, and perfluorinated polysulfonic acid containing resins. Alternatively, the ion exchange matrix selected can be inorganic ion exchangeable metal oxide and mixed metal oxide compound or compounds, for example, known natural and synthetic zeolites and molecular sieves, and inorganic layered compounds, such as hydrotalcites and mica.

According to embodiments of the present invention, a crosslinked polymer resin matrix having chemically addressable sites can be used to prepare the magnetic nanocomposite. Such a matrix is provided by, for example, an ion exchange resin. The majority of organic ion exchange resins are based upon a matrix of crosslinked polystyrene which provides a chemically and physically robust micro structure of the type needed to produce the fine particulate nanocomposite. A preferred resin is a polystyrene sulfonic acid (PSSA) ion exchange resin crosslinked from about 1 to 16% with divinylbenzene. More preferably, a 2 to 8% divinylbenzene crosslinked sulfonated polystyrene can be selected. Illustrative examples of suitable ion exchange resins include those polymers possessing chemically addressable sites dispersed throughout their matrix, or on their surface, and which sites can be used to generate an ionic component in situ. Specific examples of these resins include sulfonated and carboxylated polystyrenes, strongly acidic polyphenolics, polysulfonic acids prepared from monomers of the formula $R-CH_2-SO_3^-H^+$, weakly acidic polyacrylics with a pH of about, for example, 5 to 6, for example, polycarboxylic salts prepared from monomers of the formula $R-COO^-Na^+$, wherein R is a polymerizable monomer with from 2 to about 20 carbon atoms selected from the group consisting from alkyl, alkylene, arylalkylene or arylalkyl groups, perfluorinated polysulfonic acids, weakly acidic chelating polystyrenes, and the like, with strongly acidic sulfonated polystyrenes and perfluorinated polysulfonic acid salts being preferred. In addition, anionic exchange resins such as Baker IONAC NA-38, Baker IONAC A-554, Dowex SBR, AMBERLITE IRA-400, Dowex IX8-100, NAFION® available from DuPont, and AMBERLYST resins may also be used. Other suitable resins can be selected by one of ordinary skill in the art provided that they are compatible with the ion exchangeable resin or resins selected and providing they achieve the objectives of the present invention.

The resin matrix is preferably capable of withstanding, during nanocomposite preparation and in magnetic refrigeration process applications, repeated cycles of drying, swelling, and de-swelling and preferably will not decompose thermally below 120° C. The resin is preferably chemically unaffected by exposure to strong acids, bases or redox solutions with the exceptions of undergoing the desired ion exchange reactions.

The resin may be of an analytical or an industrial grade. Aside from differences in cost and size, the industrial grade resins typically have more color than the analytical grades. Most of the color associated with industrial grade resins is temporary and is easily removed if desired by solvent washing, usually with water or alcohol or mixtures thereof. After washing, the industrial grade resin may retain a weak amber color similar to the analytical grade.

Resin beads may be in embodiments, from about 20 to about 500 mesh and are preferably from about 20 to about 400 mesh size or between about 850 and about 38 microns. More preferably, the resin beads are from about 200 to about 400 mesh or between about 75 and 38 microns. The larger size beads have two advantages over the smaller beads. First, the processing time is shorter when using the larger beads due to faster settling rates and ease of decanting. Second, the larger beads are mechanically weaker than the smaller bead due to greater osmotic shock effects during their manufacture. Thus, magnetic refrigerant material prepared from the larger beads crushes and presumably micronizes more easily than those made from the smaller beads. Despite its weaker mechanical strength, the lower cost larger resin retains its ion-exchange capability through and even beyond ten-cycles of loading.

Commercial ion exchange resins for use in the present invention include polystyrene sulfonic acid ion exchange resins which may be obtained from such manufacturers as Rohm and Haas, DuPont, and Dow Chemical.

Alternatively, the resin selected may be submicron in size, for example, less than about 1 micron, from about 0.01 to about 1.0 micron, and preferably from about 0.05 to about 0.5 microns, so that no additional micronization step is necessary. Examples of such a matrix include a submicron sulfonated polystyrene resin, designated SSPR for the purposes of the present invention, available from Rohm & Haas in emulsion form. Additional submicron resins appropriate for use in the present invention include any submicron resins which accomplish the objects of the present invention and which do not interfere with the characteristics of the desired material properties disclosed herein.

Once a resin is selected, the resin matrix is next loaded with the precipitate precursor ion. In the case of the magnetic colloid this may be several different ions including, for example, ferrous or ferric ions in a manner described in the aforementioned U.S. Pat. No. 4,474,866 to Ziolo.

The magnetic ion loaded resin is treated so as to cause an in-situ precipitation of the material desired for dispersion. Gamma-$Fe_2O_3$ and $Fe_3O_4$, for example, may be precipitated in this manner. The nanometer size metal containing particles may be precipitated as compounds, for example as iron sulfide clusters, in their elemental forms, or preferably as the metal oxides, reference the aforementioned commonly assigned U.S. Patents and copending applications, and which particles are preferably selected based on an empirical determination of their respective magnetocaloric effect. The nanocrystalline metal containing particles are, in embodiments, from about 1.0 to about 100 nanometers in mean particle diameter, preferably from about 1.0 to about 50 nanometers, and more preferably from about 1.0 to about 10 nanometers.

Once the composite material has been formed, the ion exchange process and subsequent formation of particles may then be repeated several times to achieve higher loading of magnetic species in the composite particles. As the number of particles increases or their size increases the crosslinked ion-exchange polymer matrix becomes stressed and eventually ruptures. In a typical ion exchange resin, sufficient stress may occur after the first loading. Rupture of the composite particles may be easily detected for example, texturally, visually or microscopically.

Micronization, by for example, ball-milling of the composite product in a stable liquid or solid medium or vehicle will lead to the formation of the stable dispersion of the composite material in about 30 to about 180 minutes. A suitable vehicle is any vehicle which allows dispersion including, for example, water and water miscible materials and the like solvents, such as methanol and ethylene glycol. Examples of suitable liquid vehicles include known heat transfer fluids including water, alcohols, polyols, glycols, glycol ethers, ethers, and liquid metals, such as mercury, gallium, and mixtures thereof. Thus, in embodiments, the magnetic refrigerant composition may be formulated in water or methanol, or alternatively, a mixture of water and methanol. The vehicle may further include any material which will not adversely effect the desired magnetic, mechanical, electrical or optical properties of the nanocomposition or the refrigerant compositions, for example, water soluble polymers or surfactants.

Micronization as used herein is defined as the formation of a liquid or solid mixture through mechanical comminution of the polymeric matrix containing the magnetic nanocrystalline particles. Micronization may be accomplished by attrition, air attrition followed by dispersion in water, shaking, milling, ball milling, shaking or ball milling directly in water, or the like media. Shaking or ball milling are preferred. Coarse particles may be removed by filtration or centrifugation. The average micronization time is from about 30 to about 180 minutes.

When using submicron resin particles, no micronization step is required to form a stable colloid. A micronization step may however, be used with a submicron resin if smaller submicron particles are desired.

When a micronization step is selected, grinding or milling time is greatly reduced due to the friable nature of the nanocomposite. According to the present invention, submicron particles may be produced by growing or building from the molecular level rather than grinding larger particles down to form smaller particles. Thus, in embodiments, the ionic polymeric matrix can be formed using known submicron particle size polymerization techniques followed by in situ impregnation or formation of the magnetic nanocrystalline particles with the resulting submicron sized polymer matrix.

In exemplary examples of submicron resins, diafiltration techniques can be used in place of conventional ion exchange techniques to process the resin because of the very small size of the resin beads. The submicron resin beads may be suspended in an aqueous colloidal form prior to incorporation of the precursor metal ions, thus resulting in a stable colloidal dispersion of the resin and magnetic nanocrystalline particles subsequent to appropriate chemical treatment. Alternatively, the resin beads may be removed from the dispersed condition and dried to form a dry nanocomposite.

Ultrafiltration is a known pressure-activated membrane filtration process capable of performing a variety of selective molecular separations. For a discussion of this technology see Breslau, B. R., "Ultrafiltration, Theory and Practice," paper presented at the 1982 Corn Refiners Association Scientific Conference, Lincolnshire, Ill., Jun. 16–18, 1982, which is incorporated herein by reference in its entirety. In ultrafiltration, the process fluid flows across a membrane with pore diameters in the range of 10 to 200 Angstroms. Solvents and species whose molecular size and weight are below the molecular weight cut-off will permeate through the membrane and emerge as an ultrafiltrate, while rejected species are progressively concentrated in the retentate process stream. Ultrafiltration differs from reverse osmosis in that it employs a more "porous" membrane which will not retain low molecular weight species such as solvent molecules, rather the membrane separation application is based on particle size. Ultrafiltration covers the particle diameter range of $10^{-3}$ to $10^2$ microns.

The composite resin beads as described above may be dried prior to micronization and then subsequently micronized to produce a dry powder composite for dispersion in a fluid or solid, for example, a polymer. This dispersion of crushed composite and fluid or solid may subsequently be used in magnetic refrigerant fluid formation as illustrated herein.

The various additive or supplemental materials as disclosed above, particularly those materials which are bound to the ion exchange matrix, are stable toward settling and do not separate from the vehicle over extended thermal cycling in, for example, magnetic heating and cooling processes.

The following examples are illustrative of the invention embodied herein. All amounts are by weight percent unless specified otherwise.

EXAMPLE I

Preparation of Magnetic Refrigerant Composition.

60 grams of Dowex 50X8-400 ion exchange resin, obtained from the Aldrich Chemical Co. (Milwaukee, Wis.), were washed clean batchwise with concentrated HCl, followed by successive washings with 0.1N NaOH, deionized water, methanol and finally deionized water. The resin was then impregnated with iron ions in accordance with the aforementioned U.S. Pat. No. 4,474,866, or copending U.S. Ser. No. 08/290,125 (D/93433), the disclosures of which are incorporated by reference herein in their entirety, to afford magnetic impregnated resin nanocomposites comprising magnetic iron oxides or sulfides, such as $Fe_2O_3$, $Fe_3O_4$, $Fe_mS_n$, and the like species, and mixtures thereof. The resin loading procedure may be optionally repeated with additional batches of the same or different metal salt solutions, for example $FeCl_2$ solution, or alternatively a suitable equivalent metal salt, such as manganese salts, to produce mixed metal magnetic species, such as manganese ferrites. The mixture was then filtered and the impregnated resin washed with deionized water, first through a filter and then in batch until the filtrate tested negative for metal ions, as measured by, for example, electrochemical conductance methods. The mixture was filtered and washed clean with 2 liters, portionwise, of deionized water and then dried overnight at 110° C. to afford the desired product of ultra-fine composite particles of nanocrystalline gamma-$Fe_2O_3$ particles highly dispersed in the ion exchange resin. Transmission electron microscopy revealed that the magnetic iron oxide nanocrystals or particulate nanoclusters to be about 5 to about 15 nanometers (nm) in size and uniformly suspended or randomly dispersed in the resin.

The product was then ground in water or suitable liquid vehicle to form a stable colloid. A dry powder sample was obtained by freeze drying the colloid. The aqueous colloid and the powder samples were evaluated as magnetic refrigerant materials as described below.

EXAMPLE II

Magnetic Refrigerant Ferrofluid Preparation and Evaluation

Twenty milliliters of a ferrofluid were prepared as described in Example I above and Example 3 of U.S. Pat. No. 5,322,756, the disclosure of which is incorporated by reference in its entirety herein. The ferrofluid was then concentrated using an Amicon® 8050 ultrafiltration cell under 30 psi of dinitrogen using a cellulose membrane with an average pore size of 40 micrometers. The ferrofluid was concentrated to approximately 6 milliliters. Magnetization data as a function of temperature from 275° to 320° K were then obtained for the sample in applied magnetic fields of between 10,000 and 30,000 Gauss using a magnetic measuring device known as a SQUID magnetometer. The saturation magnetization of the sample, which was measured in electromagnetic units (emu), where one emu equals one erg per Gauss, showed a steady decline with temperature from 275° to 300° K characteristic of a ferromagnetic or ferrimagnetic material below its Curie temperature, that is, the temperature at which the saturation magnetization becomes zero and the material becomes paramagnetic. Over the temperature range of 275° to 300° K, the total magnetization of the sample as measured on the SQUID dropped by 0.04 emu in an applied field of 30,000 Gauss. Just before the Curie temperature was reached, however, the rate of change of the saturation magnetization with temperature became quite large and indicated that the Curie temperature of the material was being approached. In the present example, the saturation magnetization of the ferrofluid changed rapidly between 300° and 302° K. In this 2° K temperature range of 300° and 302° K, the saturation magnetization of the sample dropped 0.03 emu as compared to the drop of 0.04 emu over the 25° K in the temperature range of 275° to 300° K. At 302° K, the saturation magnetization of the sample immediately started to decrease at the previous slow rate to the limit of our measurement, 320° K. The precipitous drop in saturation magnetization at between 300° and 302° K was interpreted as an indication that a portion of the sample contained magnetic material with a Curie point at about room temperature. Next, the magnetization of the sample was measured as a function of magnetic field strength at constant temperature. This procedure was then repeated at several different temperatures between 275° and 300° K to generate a series of isothermal curves as taught by Shull, et al., reference the aforementioned *Nanostructured Materials*, Vol. 2, pp. 205–211, 1993. In this manner, the magnetocaloric effect was measured without calorimetry which would require measuring the change in temperature and heat capacity. The entropy variation of the sample, which is a quantitative measure of the magnetocaloric effect, was then obtained from the area enclosed by any two isotherms divided by the temperature difference between the isotherms. The entropy variation for the present sample as a function of temperature was highest in the range between approximately 295° and 300° K with a value of about 105 Joules per Kelvin degree-cubic meter (J/°K-m$^3$) at 295° K. The change in magnetic field strength ($\Delta$H) was about 20,000 Gauss. Thus, the measured entropy variation, $\Delta$S, for this stable magnetic colloid or ferrofluid, is large enough to indicate that this material may be used as a liquid magnetic refrigerant in the temperature range of approximately 290° to 300° K, and perhaps at temperatures just outside this range. Since the refrigerant in this situation is a liquid, it may be cycled rapidly through the refrigerator many times per minute thus making possible a magnetic refrigerator operating in the temperature range of approximately 290° to 300° K, and perhaps at temperatures outside this range, such as 305° to 345° K, or 250° to 280° K.

EXAMPLE III

Magnetic Refrigerant Ferrofluid Preparation and Evaluation

Thirty five milliliters of a ferrofluid were prepared as described in Example 2 of U.S. Pat. No. 5,322,756 with the exceptions that cesium hydroxide was used in the preparation instead of sodium hydroxide and the ferrofluid vehicle, water, was not allowed to evaporate as described in the example. The ferrofluid instead, was concentrated using a Amicon® 8050 stirred ultrafiltration cell under 32 psi of dinitrogen using a filter with a molecular weight cut-off of 20,000. The ferrofluid was concentrated to approximately 3 milliliters. Magnetization data as a function of temperature from 275° to 320° K were then obtained for the sample as described in Example II above. The stable water-based ferrofluid showed a practical magnetocaloric effect in the temperature range between approximately 290° and 300° K. At 295° K, the change in entropy and thus the value of the magnetocaloric effect was measured to be approximately 38 J/°K-m$^3$. The change in magnetic field strength ($\Delta$H) was about 10,000 Gauss. Thus, the measured entropy variation, $\Delta$S, for this stable magnetic colloid or ferrofluid, was sufficiently large to indicate that this material may be used as a liquid magnetic refrigerant in the temperature range of approximately 290° to 300° K. Since the refrigerant in this case is a liquid, it may be cycled rapidly through the refrigerator many times per minute thereby making possible a magnetic refrigerator operating in the temperature range of about 290° to about 300° K, and perhaps at temperatures outside this range.

EXAMPLE IV

Magnetic Refrigerant Ferrofluid Preparation and Evaluation

Sixty three milliliters of a stable, water-based ferrofluid were prepared as described in Example 3 of U.S. Pat. No. 5,322,756. This ferrofluid was then concentrated to 8.5 milliliters using an Amicon® 8200 ultrafiltration cell in a manner described above. Magnetization data as a function of temperature from 275° to 320° K were then obtained for the liquid sample as described in Example II above. The stable water-based ferrofluid thus generated and measured, showed a practical magnetocaloric effect in the temperature range between approximately 290° and 300° K. At 295° K, the change in entropy and thus the value of the magnetocaloric effect was measured to be approximately 165 J/°K-m$^3$ or approximately 4.3 times greater than that in Example III and about 1.6 times greater than the liquid sample in Example II. The change in magnetic field strength ($\Delta$H) was about 10,000 Gauss. Thus, the measured entropy variation, $\Delta$S, for this stable magnetic colloid or ferrofluid, is large enough to indicate that this material may be used as a liquid magnetic refrigerant in the temperature range of about 290° to 300° K, and perhaps at temperatures just below and just above this range as well. Since the refrigerant in this case is a liquid, it may be cycled rapidly through the refrigerator many times per minute thus making possible a magnetic refrigerator operating in the temperature range of approximately 290° to 300° K, and perhaps at temperatures below and above this range, such as 305° to 345° K, or 250° to 285° K.

EXAMPLE V

Magnetic Refrigerant Ferrofluid Powder Preparation and Evaluation

Ten milliliters of the stable, water-based ferrofluid prepared in Example IV above were freeze dried under vacuum using a standard Labconco® Freeze Dry/Shell Freeze System. The resulting dry, magnetic powder was then subjected to magnetization measurements as described in the previous examples over the temperature range from 275° to 320° K. The dried magnetic powder obtained showed a practical magnetocaloric effect in the temperature range between approximately 290° and 300° K. At 295° K, the change in entropy and thus the value of the magnetocaloric effect was measured to be approximately 320 J/°K-m$^3$ or about 1.9 times greater than that in Example IV. Thus, a solid magnetic powder consisting of nano-scale iron oxide particles dispersed in a sulfonated polystyrene polymer is obtained that shows a substantial and practical magnetocaloric effect at ambient room temperature. Thus, the measured entropy variation, $\Delta S$, for this nanocomposite material, is large enough to indicate that this material may be used as a magnetic refrigerant in the temperature range of approximately 290° to 300° K, and perhaps at temperatures just outside this range. The magnetic refrigeration industry standard and commonly used solid paramagnetic refrigerant is gadolinium gallium garnet (GGG), $Gd_3Ga_5O_{12}$, which is useful in the temperature range between approximately 7° to 15° K is limited to this temperature range and lacking the advantage of the present sample which is useful in the range of approximately 290° to 300° K, and perhaps at temperatures just below and above this range. A $\Delta S$ value, in units of J/°K-kg, for the present sample measures the same order of magnitude as that for the aforementioned GGG sample, 0.21 at $\Delta H$ of 30,000 Gauss versus 0.70 at $\Delta H$ of 10,000 Gauss, respectively. In the present sample, only about 1% of the total magnetic material is the refrigerant. Thus, the present material, containing higher concentrations of magnetic refrigerant will equal or surpass the magnetocaloric effect of GGG when compared at the same $\Delta H$. Shull, et al., reference the above citation, have shown that a composition of $Gd_3Ga_{3.25}Fe_{1.75}O_{12}$ may be used as a potential substitute refrigerant for GGG in the temperature range between 7° and 20° K and perhaps be useful at temperatures as high as 25° K. Like the Shull et al. material, the present material does not possess a remanent magnetization and therefore no hysteretic losses during field cycling. These same properties of no remanent magnetization and no hysteretic losses are also possessed by the ferrofluids in Examples II, III and IV above.

Other modifications of the present invention may occur to those skilled in the art based upon a review of the present application and these modifications, including equivalents thereof, are intended to be included within the scope of the present invention.

What is claimed is:

1. A magnetic process comprising: subjecting a magnetically susceptible media to a magnetic field wherein the media is magnetized and the magnetized media absorbs the heat of magnetization; transferring the absorbed heat from the magnetized media to a heat sink; removing the magnetized media from the magnetic field, wherein the magnetic media undergoes spontaneous cooling to produce a cooled magnetic media; and providing heat to the cooled magnetic media from a heat source, wherein said process is accomplished at about 275 degrees Kelvin, and wherein the magnetically susceptible media is a liquid or solid dispersion of a nanocomposite comprising from about 0.001 to about 60 weight percent of magnetic nanocrystalline metal oxide particles and from about 40 to about 99.999 weight percent of an ion exchange matrix, and optionally a liquid carrier or heat transfer fluid in an amount of from about 1 to about 99 weight percent based on the weight of the nanocomposite.

2. A process in accordance with claim 1 wherein the magnetically susceptible media is selected from the group of submicron magnetically susceptible solid particles dispersed in a compatible liquid medium and submicron magnetically susceptible solid particles dispersed in a compatible solid.

3. A process in accordance with claim 1 wherein the process is accomplished at from about 275° K to about 320° K.

4. A process in accordance with claim 1 wherein the magnetic field is of a strength of about 5,000 to about 35,000 Oersteds (Oe).

5. A process in accordance with claim 1 wherein the magnetically susceptible media has a magnetocaloric effect of about 0.05 to about 0.5 J/K-kg over a magnetic field change of about 30,000 Oe.

6. A process in accordance with claim 1 wherein the magnetic field is provided by a refrigerated electromagnet, a superconducting magnet, a switchable on/off electromagnet, a non-refrigerated electromagnet, a permanent magnet or magnets, or combinations thereof.

7. A process in accordance with claim 1 wherein the process is conducted at an ambient or external temperature of above about 0° C.

8. A process in accordance with claim 1 wherein the process is conducted at an ambient or external temperature of about 0° to about 50° C.

9. A process in accordance with claim 1 wherein the process is conducted without phase separation or deterioration of the components of the magnetically susceptible media.

10. A process in accordance with claim 1 wherein said removing of the magnetically susceptible media is accomplished by mechanical means, non-mechanical means, or non-magnetic means.

11. A magnetic heat transfer composition comprising a nanocomposite comprising from about 0.001 to about 60 weight percent of magnetic nanocrystalline metal oxide particles and from about 40 to about 99.999 weight percent of an ion exchange matrix, and optionally a liquid carrier or heat transfer fluid in an amount of from about 1 to about 99 weight percent based on the weight of the nanocomposite, and wherein the ion exchange matrix is selected from the group consisting of inorganic ion exchangeable metal oxide and mixed metal oxide compounds.

12. A composition according to claim 11, wherein the magnetic nanocrystalline metal oxide particles are formed from magnetic metal ions selected from the group consisting of a transition metal element, a lanthanide series element, and mixtures thereof.

13. A composition according to claim 11, wherein the magnetic heat transfer composition has a magnetic saturation moment of greater than about 15 emu per gram.

14. A composition according to claim 11, wherein the magnetic heat transfer composition has a maximum magnetocaloric effect in the temperature range of from about 290° to about 310° K.

15. A composition according to claim 11, further comprising at least one heat conducting additive selected from the group consisting of non-metallic and metallic fillers particles.

* * * * *